United States Patent Office
3,458,535
Patented July 29, 1969

3,458,535
PROCESS FOR THE PREPARATION OF TETRAFLUOROETHYLENE OXIDE
Franco Gozzo, Saronno, Varese, and Venanzio Oprandi, Bergamo, Italy, assignors to Montecatini Edison, S.p.A., Milan, Italy
No Drawing. Filed Dec. 21, 1965, Ser. No. 515,457
Claims priority, application Italy, Jan. 4, 1965, 129/65
Int. Cl. C07d 1/08; B01j 11/08
U.S. Cl. 260—348.5
9 Claims

ABSTRACT OF THE DISCLOSURE

Tetrafluoroethylene is reacted with an oxygen containing gas in the presence of a silver catalyst at about 80°–150° C. to produce tetrafluoroethylene oxide.

The present invention relates to a process for the production of tetrafluoroethylene oxide, and, more particularly, it relates to a process for the production of tetrafluoroethylene oxide via the catalytic oxidation of tetrafluoroethylene.

Tetrafluoroethylene oxide has only been recently prepared, and, together with other fluorinated organic compounds of recent vintage, has been the object of much interest, in view of prospective industrial development and employment. In fact this compound is used as intermediate product in the synthesis of interesting organic compounds containing groups such as —$CF_3$ and/or groups

For example it is possible, by means of irradiation with ultraviolet light of tetrafluoroethylene oxide in the vapor state, to obtain $CF_3$—$CF_3$; by means of irradiation of tetrafluoroethylene oxide with ultraviolet light in the presence of oxygen it is possible to obtain

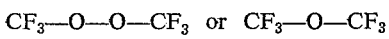

by means of catalytic isomerization of tetrafluoroethylene oxide it is possible to obtain $CF_3$—COF; and of particular interest are the fluorinated polyethers containing the terminal groups —$CF_3$ and

which are obtained from the tetrafluoroethylene oxide.

Tetrafluoroethylene oxide was recently prepared from tetrafluoroethylene which had been oxidized by irradiation with ultra-violet light.

In applicant's pending Italian application n. 5/64 a process for the production of tetrafluoroethylene oxide is described comprising subjecting a tetrafluoroethylene and molecular oxygen mixture to irradiation with ultra-violet light of short wave length. Other than tetrafluoroethylene oxide, the products obtained in the hereinabove mentioned process comprise carbonyl fluoride, small quantities of perfluorocyclopropane, and polymers of a polyoxyperfluoromethylenic structure an average molecular weight higher than 1000.

Conducting a process which employs ultra-violet light on an industrial scale, however, presents the drawback of being quite complicated and relatively expensive because of the need for a great number of radiation sources.

No process different from that mentioned above and that of the present invention is known for the production of tetrafluoroethylene oxide. Accordingly, the present invention describes a process which, surprisingly affords tetrafluoroethylene oxide by catalysis, thus avoiding the employment of irradiation.

It is, therefore an object of the present invention to provide a new, simple and inexpensive process for the preparation of tetrafluoroethylene oxide.

It is another object of the present invention to provide a process for the preparation of tetrafluoroethylene oxide which permits of good conversions and high yields.

These and other objects are realized according to the process of the present invention which process is also susceptible to being conducted simply and with the use of readily available and inexpensive catalysts.

Another advantage of the process of this invention is the particular effectiveness and selectivity of the catalysts employed.

A further advantage, which contributes to the economy of the process of this invention, is the duration of catalytic activity displayed by the catalysts employed.

According to the present invention, tetrafluoroethylene oxide can be prepared by the reaction between tetrafluoroethylene and molecular oxygen and by passing a mixture of the aforesaid gases over a catalyst consisting essentially of silver or inorganic silver compounds at temperatures ranging from between about 80° and about 150° C. and at pressures lower than 2 absolute atmospheres.

By operating according to this invention, tetrafluoroethylene oxide is obtained in the following manner: into a tubular nickel reactor opened at both ends is placed a suitably activated catalyst consisting essentially of silver or silver oxides or silver salts, employed either alone or in admixture with inorganic compounds of other metals, either supported or free of carriers, preferably, of a granular shape; thence a gaseous mixture of tetrafluoroethylene and molecular oxygen having a molar ratio of $C_2F_4$ to $O_2$ ranging from between 0.1 and 0.50 is charged to the reactor through the catalyst mass at temperatures ranging from between 80° and 150° and at pressures lower than two absolute atmospheres at such a flow speed as to have a rate of $C_2F_4$ ranging from 1 N cc./h. to 1,000 N cc./h. per catalyst gram. The mixture of gaseous reaction products coming from the reactor consists of tetrafluoroethylene oxide, $COF_2$, small quantities of $CO_2$ and perfluorocyclopropane, and unreacted tetrafluoroethylene and $O_2$. There is also formed small quantities of a liquid polymeric product, which polymers have a polyoxyperfluormethylenic —($CF_2O$—)$_n$ structure of a neutral character. The gaseous reaction products coming from the reactor are passed through a container held at room temperature wherein the aforesaid liquid polymer is deposited; and in order to render collection of the liquid polymer easier the reactor is placed in said container at a slight bend or in a vertical position, so that portions of said polymeric liquid deposited on the reactor walls can flow towards the collecting container; the gases coming from the liquid polymer collecting container are condensed at temperatures ranging between —110° and —120° C., thus effecting a practically complete condensation of tetrafluoroethylene oxide, together with minor quantities of tetrafluoroethylene, perfluoroethylenecyclopropane and carbonyl fluoride; the uncondensed gases, consisting of unreacted tetrafluoroethylene and $O_2$ and carbonyl fluoride, are made to bubble through an absorption tower containing alkaline compounds, in order to absorb all the carbonyl fluoride, so that the mixture of thus purified tetrafluoroethylene and oxygen is recycled; and the previously condensed gases forming a mixture enriched by tetrafluoroethylene oxide are subjected to fractional distillation and, in this manner, pure oxide is obtained.

The reaction mixture can consist of $C_2F_4$ and molecular $O_2$ or of $C_2F_4$ and air; and in some cases oxygen with a very low ozone content ranging from $2 \times 10^{-3}$ to $10^{-6}$ g./h. was advantageously employed in the mixture. The molar ratio of $C_2F_4$ to $O_2$ in the reaction mixture is comprised from between about 0.1 and 0.43, when pure oxygen is used, and from between about 0.1 and 1 when air is used.

An excess of $O_2$ with respect to tetrafluoroethylene is advantageous for catalyst longevity.

The catalysts employed according to the present invention are of the class comprising metallic silver, silver oxides and oxyfluorides and either alone or in admixture with the oxides or salts of other elements. It was found that silver oxide obtained by precipitation from a silver nitrate solution by means of alkaline compounds, subsequently dried in air or under vacuum at temperatures ranging between 80° and 150° C. for from 2 to 10 hours could be advantageously employed. Good results have also been obtained by subjecting said catalyst to a preliminary activation by passing a current of $O_2$ at temperatures from between about 100° and 150° C. through the catalyst mass in the reactor.

Also advantageous was found to be the employment of silver oxide mixtures with the oxides or salts of other metals, or of silver itself, such as, for example $Ag_2O$-$MnO_2$, $Ag_2O$-$Cr_2O_3$, $Ag_2O$-$PbO_2$, $Ag_2O$-$BaO_2$, $Ag_2O$-$Ag_2S_2O_8$. Said mixtures may be obtained both through co-precipitation and precipitation of silver oxide from solutions containing the co-catalyst oxide which is to be employed in the catalytic pair in suspension.

Likewise advantageous was the use of supported catalysts of the above mentioned type,, such as, for example, metallic silver on carborundum and preliminarily activated, for example, with ozonized oxygen at temperatures of from between 100° and 150° C.

Though the oxidation reaction may take place in the presence of said catalysts when same have not been subjected to preliminary activation, a preliminary activation of the catalysts was found to be particularly suitable. It can be carried out by passing a current of molecular $O_2$ through the catalyst mass at temperatures of from between about 100° and 150° C. and at atmospheric or reduced pressures; as a variant the activation can be carried out by means of ozonized oxygen at the same conditions of temperature.

An analysis carried out many hours after reaction on a catalyst initially composed of silver oxide demonstrated that a part of the oxygen bound to the silver was replaced by fluorine; however, without a lowering of the catalyst activity thereof.

One can also advantageously pass a current of oxygen through the catalyst mass after said catalyst mass has been subject to use for a certain time to eliminate therefrom liquid polymer traces which settle on the catalyst during the course of reaction thus polluting it, and which, although there is no appreciable diminution in catalytic activity is desirable. The same objective can be obtained, without interrupting the reaction, by operating under reduced pressures or with low partial pressures of $C_2F_4$.

A very important factor according to the process of this invention is catalyst temperature, which ranges from 80° to 150° and preferably, from between 100° and 130° C.; and within this range an optimum temperature is determined for the catalyst employed. Moreover, for good results according to the process of the present invention, it is very important to keep the temperature constant throughout the entire reaction, and with a control of thermal dispersion and reagent flow speed; thus avoiding elevated temperatures which could quite readily influence the reaction towards the production of compounds having an oxidation ratio greater than epoxide, for example, $COF_2$ and $CO_2$.

The contact times between the mixture of the reaction gases and the catalyst are likewise allied to the temperature: they correspond to such flow speeds as to have a flow rate of $C_2F_4$ comprised from between 1 N cc./h. and 1000 N cc./h., and, preferably, from between 10 N cc./h. and 100 N cc./h., per catalyst gram.

The pressure utilized is not critical; the process according to the present invention, however is preferably conducted at pressures lower than two absolute atmospheres.

To illustrate further the present invention and the advantages thereof, the following specific examples are given, it being understood that these are merely intended to be illustrative and not limitative.

More particularly, in order to better illustrate the nature of the catalytic oxidation of tetrafluoroethylene according to the present invention, and in order to better evidence the importance of the catalysts in this process, tests were conducted in which the oxidation of tetrafluoroethylene with molecular $O_2$ was carried out in the absence of catalysts and in such a case the products were exclusively carbonylic, such as $COF_2$ and $CO_2$, whereas the desired epoxide was absent. An uncatalyzed tetrafluoroethylene oxidation test was conducted with ozonized oxygen; and among the reaction products there appeared small quantities of tetrafluoroethylene oxide, but in very loy yields, the main reaction product being $COF_2$.

These examples, therefore, evidence that catalytic action is necessary for the selective oxidation of tetrafluoroethylene to tetrafluoroethylene oxide without concomitant production of other oxidation products.

EXAMPLE 1

A nickel tube having a diameter of 10 mm., and a length of 1,200 mm. was filled for a tract of 900 mm. with 50 g. of a catalyst consisting of silver oxide in the form of small cylinders with dimensions of 2 x 4 mm.

The catalyst is prepared in the following manner: 384 g. of a 6.4% KOH solution were added, drop by drop to 433 g. of a 17% $AgNO_3$ solution under vigorous stirring at a temperature of 35° C.

The precipitated silver oxide was then washed with distilled water, pelletized and partially dried at 80° in air for two hours.

After charging the tubular reactor, same was placed in an oven heated at a constant temperature of 120° C. Before commencing the reaction, an oxygen stream, was passed through the catalyst at a flow rate of 10 l./h. for 50 hours. An anhydrous mixture of 25% by volume $C_2F_4$ and 75% of $O_2$, was thence made to flow at room pressure into the reactor, with a total flow rate of 8 Nl./h.

The nickel tube was further connected to a condensation container held at room temperature, and wherein 0.5 g. colourless liquid were collected after 10 operating hours. An I.R. spectrum of this product was substantially identical to that of a liquid polymer sample having the structure $(-CF_2-O-)_n$ and which did not depict appreciable absorption in the range of carbonylic groups.

Downstream from the collecting container of the liquid polymer flowed a gaseous mixture having the following molar composition, determinated for organic components by chromatographic analysis:

| | |
|---|---|
| $C_2F_4$ | 65.9% |
| $CF_2-CF_2$ $\diagdown O \diagup$ | 13.6% |
| $COF_2 (+ CO_2)$ | 20.4% |
| c-$C_3F_6$ | Traces |

This was equivalent to a tetrafluoroethylene conversion equal to 26.6% and to a net yield in tetrafluoroethylene oxide equal to 57%.

Reaction conditions were maintained constant for 200 hours, at the end of which time a control of the products indicated that the catalyst maintained its activity substantially unchanged.

EXAMPLE 2

In the identical reactor of Example 1 there was placed 104 g. silver oxide having a granular size of between 7 and 14 mesh. This catalyst had been prepared by precipitation following the procedure described in the foregoing example, pelletized, partially dried under vacuum at 80° C. for 5 hours and thence ground and screened.

After charging, a stream of $O_2$ was passed through the catalyst for two days at a flow rate of 10 l./h. which was held at a temperature of 120° C. An anhydrous mixture consisting of 20% by volume $C_2F_4$ and of 80% $O_2$ was thence made to pass into the reactor, with a total flow rate of 12 Nl./h.

The temperature of the outer reactor wall in the zone of the catalyst was 115° C. The pressure was 1 absolute atmosphere.

The reaction was continued for more than 200 hours. Samples of gases drawn from time to time downstream from the reactor and analyzed by gas chromatography displayed the following molar composition (limited to organic compounds):

| | |
|---|---|
| $C_2F_4$ | 78.1% |
| $CF_2\!\!-\!\!CF_2$ with O bridge | 10.30% |
| $COF_2 (+ CO_2)$ | 11.5% |
| $c\text{-}C_3F_6$ | Traces |

This is equivalent to a tetrafluoroethylene conversion of 17% and to a net tetrafluoroethylene oxide yield of 64%.

Downstream from the collecting container of the polymeric product, these gases were partially condensed in a container immersed in a dichlorofluoromethane and trichlorofluoromethane mixture maintained at a temperature of −115° C. with liquid air. Thus a mixture was collecting consisting essentially of tetrafluoroethylene oxide and tetrafluoroethylene and was then subjected to fractional distillation.

The gases which were not condensed in the bath at −115° C. were directed into a tower containing an aqueous solution of KOH and wherein there was eliminated $COF_2$ and $CO_2$. The gases thus emanating from this washing tower are tetrafluoroethylene and oxygen and which are recycled.

EXAMPLE 3

A microreactor of glass, consisting of a cylinder with an inner diameter of 10 mm., a height of 220 mm., and welded in the lower part with a flask that has a capacity of 5 cc. and provided with a vent pipe, was vertically mounted in a thermostatic oil bath.

Spiral piping having a diameter of 4 mm., also immersed in the bath, was used for preheating the reacting gases and was connected to the upper end of the microreactor.

From the vent pipe downstream from the microreactor, the continuously flowing gases were drawn and analyzed by gas chromatography.

Into cylindrical part of the microreactor 10 g. catalyst was charged consisting of 95% silver oxide and 5% $MnO_2$. This catalyst had been prepared by precipitation from an $AgNO_3$ solution by means of NaOH solution that contained manganese dioxide. The precipitate had been filtered, washed, pelleted, partially dried for 5 hours at 80° C. under vacuum, and finally ground and screened, so as to use the fraction having a granulation size of between 7 and 14 mesh. After introduction into the microreactor, the catalyst had been activated by a stream of 5 l./h. of $O_2$ for 60 hours at 110° C.

An anhydrous mixture consisting of 20% by volume $C_2F_4$ and 80% $O_2$ was thence made to flow at an absolute pressure of 800 mm. Hg and with a flow rate of 5 Nl./h., while maintaining the thermostatic bath at 105° C.

Analysis of the gases coming from the microreactor indicated a tetrafluoroethylene conversion equal to 9%, with a net yield in tetrafluoroethylene oxide equal to 56%, the remainder of the products mainly being $COF_2$.

EXAMPLE 4

Making use of the apparatus described in the foregoing example, 11 g. of a catalyst consisting of 95% silver oxide and 5% $Cr_2O_3$ were charged into the microreactor. This catalyst had been prepared following the procedure described in Example 3, and had a granulometric size of between 7 and 14 mesh. Before starting the reaction it was treated with a 5 l./h. stream of $O_2$ for 24 hours at 135° C.

An anhydrous mixture consisting of 20% by volume $C_2F_4$ and 80% $O_2$ was thence made to react on the catalyst at a flow rate of 3.5 Nl./h., at an absolute pressure of 800 mm. of Hg, and while maintaining the thermostatic bath at 110° C.

Analysis of the gases coming from the microreactor indicated a tetrafluoroethylene conversion equal to 6% with a net tetrafluoroethylene oxide yield equal to 75%.

EXAMPLE 5

Using the apparatus described in Example 3, 10.8 g. of a catalyst consisting of carborundum onto which metallic silver had been supported via electrolytic deposit, were charged into the microreactor. The catalyst granulometric size ranged from between 14 and 24 mesh. The percentage of supported silver was about 1%. It was activated at 120° C. by an ozonated $O_2$ stream employing 0.28 g. of $O_3$. This activation was carried out after having ascertained that the passage of only molecular oxygen was not sufficient to render the catalyst appreciably active.

An anhydrous mixture consisting of 0.1 Nl./h. $C_2F_4$ and 0.4 Nl./h. of $O_2$ was continuously fed at room pressure into the microreactor, which was held at a temperature of 120° C. Coming from the microreactor, the gaseous reaction mixture was analyzed to have the following molar composition:

| | |
|---|---|
| $C_2F_4$ | 85.8% |
| $CF_2\!\!-\!\!CF_2$ with O bridge | 5% |
| $COF_2 (+ CO_2)$ | 9.1% |
| $c\text{-}C_3F_6$ | Traces |

This is equal to a tetrafluoroethylene molar conversion equal to 10% with a net tetrafluoroethylene oxide yield equal to 52%.

EXAMPLE 6

Using an apparatus of the type described in Example 3, series tests of an hour each were carried out, so as to verify catalyst as well as oxone influence during the tetrafluoroethylene oxidation reaction.

Conditions and results are reported in Table 1.

Tests 1 and 2 were carried out without catalyst, and with the microreactor filled with Fenske rings. Tests 3 to 7 were carried out using the same catalyst, and consisting of silver oxide prepared by precipitation as described in Example 1, and dried at 80° C. for 15 hours and at 120° C. for 2 h. No activation with oxygen had been effectuated on that catalyst before reaction.

All experiments were carried out at room pressure.

EXAMPLE 7

Using the apparatus described in Example 3, 10 g. of a catalyst consisting of 95% silver oxide and 5% $PbO_2$ were charged into the microreactor. This catalyst had been prepared following the procedure described in Example 3 and had a granulometric size of between 42 and 65 mesh. Before starting the reaction it was treated with a 5 l./h. stream of $O_2$ for 48 hours at 130° C.

An anhydrous mixture consisting of 0.8 Nl./h. $C_2F_4$ and 3.2 Nl./h. of $O_2$ was continuously fed into the microreactor which was held at a temperature of 120° C.

Analysis of the gases coming from the microreactor indicated a tetrafluoroethylene conversion equal to 3.87% with a net tetrafluoroethylene oxide yield equal to 64%.

EXAMPLE 8

Using an apparatus described in Example 3, 14 g. of a catalyst consisting of 95% silver oxide and 5% $BaO_2$ were charged into a microreactor. The catalyst granulometric size ranged from between 41 and 65 mesh.

It was activated at 120° C. by an ozonated $O_2$ stream employing 0.30 g. of $O_3$.

Analysis of the gases coming from the microreactor indicated a tetrafluoroethylene conversion equal to 6.4% with a net tetrafluoroethylene oxide yield equal to 42%.

EXAMPLE 9

Using an apparatus of the type described in Example 3, 13.7 g. of a catalyst consisting of 95% silver oxide and 5% $Ag_2S_2O_8$ were charged into a microreactor: this catalyst had a granulometric size of between 42 and 65 mesh.

It was activated at 120° C. by an ozonated $O_2$ stream employing 0.12 g. of $O_3$.

An anhydrous mixture consisting of 0.1 Nl./h. $C_2F_4$ and 0.4 Nl./h. of $O_2$ was continuously fed into the microreactor.

Analysis of the gases coming from the microreactor indicated a tetrafluoroethylene conversion equal to 4.45% with a net tetrafluoroethylene oxide yield equal to 46.5%.

ratio of tetrafluoroethylene to air is from between 0.1 to 1.0.

5. A process according to claim 3 wherein the flow rate of tetrafluoroethylene is from between 1 N cc./h. to 1,000 N cc./h. per catalyst gram.

6. A process according to claim 4 wherein the flow rate of tetrafluoroethylene is from between 1 N cc./h. to 1,000 N cc./h. per catalyst gram.

7. A process according to claim 1 wherein the silver catalyst is a mixture of silver oxide and an inorganic oxide selected from the group consisting of $MnO_2$, $Cr_2O_3$, $PbO_2$, $BaO_2$ and $Ag_2S_2O_8$.

8. A process according to claim 5, wherein the flow rate of tetrafluoroethylene is between about 10 N cc./h. and 100 N cc./h. per catalyst gram.

9. A process according to claim 6, wherein the flow rate of tetrafluoroethylene is between about 10 N cc./h. and 100 N. cc./h. per catalyst gram.

TABLE

| Test No. | G. of silver oxide catalyst | Flow rates | | | Temperature, ° C. | Results | |
|---|---|---|---|---|---|---|---|
| | | $C_2F_4$, Nl./h. | $O_2$, Nl./h. | $O_3$, g./h. | | Percent $C_2F_4$ molar conversion | Percent net yield in $C_2F_4O$ |
| 1 | Absent | 0.1 | 0.4 | Absent | 120 | 0 | 9 |
| 2 | Absent | 0.1 | 0.4 | $2.10^{-3}$ | 120 | 10.4 | 26 |
| 3 | 4 | 0.1 | 0.4 | $10^{-3}$ | 120 | 11.4 | 39 |
| 4 | 4 | 0.1 | 0.4 | $10^{-4}$ | 120 | 8.1 | 43 |
| 5 | 4 | 0.1 | 0.4 | $10^{-5}$ | 120 | 5.3 | 47 |
| 6 | 4 | 0.1 | 0.4 | $10^{-6}$ | 120 | 5.5 | 47 |
| 7 | 4 | 0.1 | 0.4 | Absent | 120 | 4 | 48 |

We claim:

1. A process for the preparation of tetrafluoroethylene oxide comprising contacting a mixture of tetrafluoroethylene and a member selected from the group consisting of molecular oxygen and a molecular oxygen containing gas with a silver catalyst selected from the group consisting of metallic silver, silver oxide, silver salts, and mixtures consisting essentially of said silver compounds and an inorganic oxide selected from the group consisting of $MnO_2$, $Cr_2O_3$, $PbO_2$, $BaO_2$ and $Ag_2S_2O_8$ at a reaction temperature of about 80°–150° C., said silver catalyst having been preliminarily activated via treatment with a gas stream selected from the group consisting of a molecular oxygen stream and a molecular oxygen stream containing a small amount of ozone at temperatures of from 100° C. to 150° C., and recovering tetrafluoroethylene oxide therefrom.

2. A process according to claim 1, wherein the catalyst is metallic silver on a carborundum support, and wherein the gas stream employed to preliminarily activate the catalyst is a molecular oxygen stream containing a small amount of ozone.

3. A process according to claim 1 wherein the mixture is tetrafluoroethylene and molecular oxygen, and wherein the molar ratio of tetrafluoroethylene to molecular oxygen is from between about 0.1 and about 0.43.

4. A process according to claim 1 wherein the mixture is tetrafluoroethylene and air, and wherein the molar

References Cited

UNITED STATES PATENTS

| | | | |
|---|---|---|---|
| 2,367,169 | 1/1945 | Gardner | 260—348.5 |
| 2,424,084 | 7/1947 | Finch et al. | 260—348.5 |
| 2,424,086 | 7/1947 | Bergsteinsson et al. | 260—348.5 |
| 2,769,016 | 10/1956 | Lichtenwalter et al. | 260—348.5 |
| 2,829,147 | 4/1958 | Molotsky | 260—348 |
| 2,831,870 | 4/1958 | McClements et al. | 260—348.5 |
| 2,879,276 | 3/1959 | Mayo | 260—348.5 |

FOREIGN PATENTS

| | | |
|---|---|---|
| 1,322,597 | 2/1963 | France. |
| 947,364 | 8/1956 | Germany. |

OTHER REFERENCES

Malinovskii, M. S.: "Epoxides and Their Derivatives" (1965), pp. 56–68.

Alien Property Custodian, application of G. H. Visser, Ser. No. 290,077, published Apr. 20, 1943, now abandoned.

NORMA S. MILESTONE, Primary Examiner

U.S. Cl. X.R.

252—439, 467, 471, 475, 476